Figure 1:
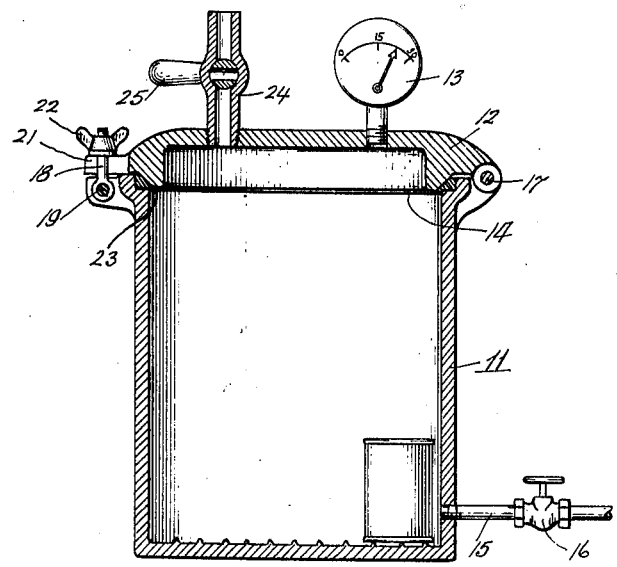

June 29, 1926.

B. S. CLARK 1,590,736

METHOD OF TESTING FILLED AND CLOSED CANS

Filed July 10, 1919

Inventor:-
Berton S. Clark
By:- Munday Clarke & Carpenter
Attys:-

Patented June 29, 1926.

1,590,736

UNITED STATES PATENT OFFICE.

BERTON S. CLARK, OF MAYWOOD, ILLINOIS, ASSIGNOR TO AMERICAN CAN COMPANY, OF NEW YORK, N. Y., A CORPORATION OF NEW JERSEY.

METHOD OF TESTING FILLED AND CLOSED CANS.

Application filed July 10, 1919. Serial No. 309,938.

This invention relates in general to packing food products in sealed containers and although it has more general application to the packing of such products in tin or other sheet metal cans, it can also as will be presently understood be employed to advantage in connection with the packing of such products in glass and other containers.

The principal object of the invention is the provision of a method or process of quickly and easily detecting with complete accuracy leaky cans and this without necessitating waiting for the contents to deteriorate.

The invention contemplates the provision for detecting any leaks that may be present in a batch of filled cans immediately upon the completion of the processing and sealing operations.

The invention has for a further important object the provision of such a process which may be practiced without the necessity of providing complicated or especially constructed devices, equipment or apparatus.

Numerous other objects of the invention and advantages resulting from it will be apparent from the following procedure described as an illustrative embodiment of the invention, since such apparatus as is necessary is well known in the canning art no drawing is thought essential to an understanding of the invention and none is provided.

Referring to the drawings:—

Figure 2:
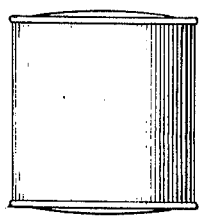

Figure 1 is a sectional view of a suitable apparatus for testing filled cans in accordance with my invention, and Fig. 2 is an elevational view of a defective can after testing, showing the effect of the test upon a can.

To illustrate my invention, I have shown a body 11, a cover 12, means for admitting fluid under pressure to within said body, means for exhausting fluid from within said body and a pressure gauge 13 for indicating the pressure within said body.

The body 11 may be of any suitable form and of sufficient size and capacity to contain one or any number of cans to be treated, and is provided with an opening 14 adapted to be closed by the cover 12. To provide an intake means, I have shown a pipe 15, communicating with the interior of the chamber, and a valve 16 for controlling the fluid. The cover 12 may be of any suitable form and attached to the body in any suitable manner. In the present instance, I have shown the cover 12 provided with suitable lugs and hinged to the body at 17 in companion lugs on the body. Any suitable clamping device may be provided to secure the cover in position, and in the present instance, I have shown a screw-eye 18 pivoted at 19 in suitable lugs on the body and of sufficient length to extend over one or more projections 21 on the cover 12 and to receive a thumb nut 22. Any suitable form of gasket 23 may be provided to provide a tight seal between the cover and body. To provide an exhaust means, I have shown a spigot valve 24 attached to the cover 12 and communicating with the interior thereof at one end and with the atmosphere at the other, said spigot valve having a handle 25 to facilitate the operation thereof. The gauge 13 may be of any suitable type and character and may be attached to the cover as shown or to the body 11.

The cans after processing (meaning heating with steam under pressure, so as to cook or sterilize) and sealing are first cooled or permitted to cool either by the application of some cooling agency or by permitting them to stand in air at atmospheric temperature. The cooling mentioned means merely that the cans are permitted to acquire a temperature substantially below the heat of processing in order that the usual resulting vacuum within the can may be created. The invention employs the theory that if the seams of the cans permit leakage the cans may be caused to leak artificially and in a manner readily permitting detection of the leaks and the selection of the cans having them. The cooled cans are then placed in a confined space and relatively high fluid pressure placed upon them. This may be accomplished by placing the cans in any suitable retort, such as the device above described, sealing the retort and pumping air into it until the desired pressure is acquired. This pressure drives the air in through the leaks by reason of the difference of the pressure without and within the cans. The period of time in which the cans are left in the retort depends, of course, in large measure upon the extent of pressure provided. I have found that a pressure of twenty-five pounds per square inch when sustained by the cans for a period of twelve hours gives excellent results, even where the leaks are minute and the equalization of the pressure a relatively slow action.

After the cans have been subjected to the pressure for an adequate period of time, i. e. until the pressure within the cans that leak equals or nearly equals the applied pressure, the pressure is quickly relieved through the exhaust means or valve 24 from the confined space or retort. By "quickly" I mean with more rapidity than the air can escape outward through leaks that the cans may have. This results in the provision of a greater pressure within the cans that leak than is present without them and produces swelled ends. That is to say, the excess of pressure in the leaky cans causes the ends to bulge outwardly, as shown in Fig. 2, whereas the cans which do not leak are unaffected. The leaky cans thus selected immediately after processing may either be treated to close the leaks or the contents recovered and repackaged.

The process just described may be practiced also to advantage to detect leaks in cans which have been stored for an appreciable period and it will of course be manifest, since the cans require merely to be put in the retort or confined space and taken therefrom, that no danger of marring the labels results.

The same process may be used in determining whether or not leaks exist in products packed in glass, for with these containers also a vacuum is usually created after the sealing. By applying the high pressure this vacuum is more quickly destroyed than it would be by mere external air pressure. When used with glass, however, it would of course be necessary to individually test the tightness of the closure of each can to see whether or not vacuum still existed. Where the process is employed with tin or sheet metal containers the bulging ends are immediately apparent to the eye. It will be apparent also that the invention permits the testing of a considerable number of cans at each testing operation.

I claim:—

1. The process of treating cans after processing and closing for detecting leaks, which comprises permitting the sealed processed cans to cool, subjecting said cans to external air pressure in excess of the pressure within the cans, and relieving said cans from said external pressure and thereby causing a strong outward pressure of air within the cans.

2. The process of treating cans after processing and closing for detecting leaks, which comprises permitting the sealed processed cans to cool, subjecting said cans to external air pressure in excess of atmospheric pressure, and relieving the cans from said external pressure and thereby causing a strong outward pressure of air within the cans in excess of atmospheric pressure.

3. The process of treating filled cans, which consists in heating and processing and then cooling the cans, and thereby establishing a condition of more or less vacuum in the cans, then subjecting the cans to external fluid pressure which co-operates with the internal suction of said vacuum to penetrate inwardly through any leaks which the cans may have, and then relieving the external pressure and thus causing portions of the leaky cans to be bulged outward.

BERTON S. CLARK.